US 11,442,682 B2

United States Patent
Bamba et al.

(10) Patent No.: US 11,442,682 B2
(45) Date of Patent: Sep. 13, 2022

(54) ENTERTAINMENT APPARATUS, DISPLAY CONTROLLING METHOD, AND DISPLAY CONTROLLING PROGRAM

(71) Applicant: Sony Interactive Entertainment Inc., Tokyo (JP)

(72) Inventors: Syunsuke Bamba, Tokyo (JP); Masanori Nomura, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/966,068

(22) PCT Filed: Jan. 30, 2019

(86) PCT No.: PCT/JP2019/003159
§ 371 (c)(1),
(2) Date: Jul. 30, 2020

(87) PCT Pub. No.: WO2019/151323
PCT Pub. Date: Aug. 8, 2019

(65) Prior Publication Data
US 2020/0356332 A1    Nov. 12, 2020

(30) Foreign Application Priority Data
Feb. 5, 2018    (JP) .............................. JP2018-018108

(51) Int. Cl.
*G06F 3/14*    (2006.01)
*A63F 13/49*    (2014.01)
(Continued)

(52) U.S. Cl.
CPC ............ *G06F 3/1423* (2013.01); *A63F 13/49* (2014.09); *A63F 13/533* (2014.09);
(Continued)

(58) Field of Classification Search
CPC ........ G06F 1/163; G06F 3/011; G06F 3/0482; G06F 3/1423; A63F 13/49; A63F 13/533;
(Continued)

(56) References Cited

U.S. PATENT DOCUMENTS

| 7,805,681 | B2 | 9/2010 | Hansson |
| 10,406,443 | B2 | 9/2019 | Lmai |

(Continued)

FOREIGN PATENT DOCUMENTS

| JP | 2010536077 A | 11/2010 |
| JP | 2012044491 A | 3/2012 |

(Continued)

OTHER PUBLICATIONS

International Preliminary Report on Patentability for corresponding PCT Application No. PCT/JP2019/003159, 16 pages, dated Aug. 20, 2020.

(Continued)

*Primary Examiner* — Nelson M Rosario
(74) *Attorney, Agent, or Firm* — Matthew B. Dernier, Esq.

(57) ABSTRACT

An entertainment apparatus, a display controlling method and a display controlling program are provided which are capable of presenting a compatibility situation of a program or content with VR display to a user without relying upon representation by a selection target itself from which the program or the content can be identified. A compatibility situation data acquisition unit acquires compatibility situation data indicative of a compatibility situation with virtual reality display of the programs or the content upon selection by the user, the compatibility situation data being different from the selection targets. A screen image generation unit generates, on the basis of the compatibility situation data, the screen image including information indicative of a (Continued)

compatibility situation with virtual reality display of the program to be executed or the content to be reproduced in response to selection from the selection targets. A display controlling unit causes the screen image to be displayed.

10 Claims, 12 Drawing Sheets

(51) Int. Cl.
  *A63F 13/533* (2014.01)
  *G06F 3/0482* (2013.01)
(52) U.S. Cl.
  CPC ... *A63F 2300/308* (2013.01); *A63F 2300/554* (2013.01); *G06F 3/0482* (2013.01)
(58) Field of Classification Search
  CPC ............... A63F 13/77; A63F 2300/308; A63F 2300/554; G09G 2354/00
  See application file for complete search history.

(56) References Cited

U.S. PATENT DOCUMENTS

| | | | |
|---|---|---|---|
| 2009/0019398 A1 | 1/2009 | Hansson | |
| 2010/0107150 A1 | 4/2010 | Kamada | |
| 2012/0200679 A1* | 8/2012 | Kawaguchi | H04N 13/359 348/51 |
| 2014/0306866 A1* | 10/2014 | Miller | G02B 27/017 345/8 |
| 2014/0349753 A1 | 11/2014 | Lmai | |
| 2014/0364228 A1* | 12/2014 | Rimon | A63F 13/25 463/32 |
| 2016/0271490 A1 | 9/2016 | Tamura | |
| 2016/0335712 A1* | 11/2016 | Tapley | G06F 3/04815 |
| 2018/0005440 A1* | 1/2018 | Mullins | G06F 9/452 |
| 2018/0286122 A1* | 10/2018 | Nakashima | G06F 3/012 |

FOREIGN PATENT DOCUMENTS

| | | |
|---|---|---|
| JP | 2016137250 A | 8/2016 |
| WO | 2008114491 A1 | 9/2008 |
| WO | 2009007799 A1 | 1/2009 |
| WO | 2015068699 A1 | 5/2015 |

OTHER PUBLICATIONS

International Search Report for corresponding PCT Application No. PCT/JP2019/003159, 4 pages, dated Apr. 9, 2019.
Yurugadge Channel; Finally Got It! "PlayStation VR" First Review! User Friendliness; "Can You Play It Without a TV?" <URL:http://yurugadge-channel.com/article/181235678.html> 11 pages, Oct. 9, 2017 (for relevancy see International Search Report for corresponding PCT Application No. PCT/JP2019/003159 cited above).

* cited by examiner

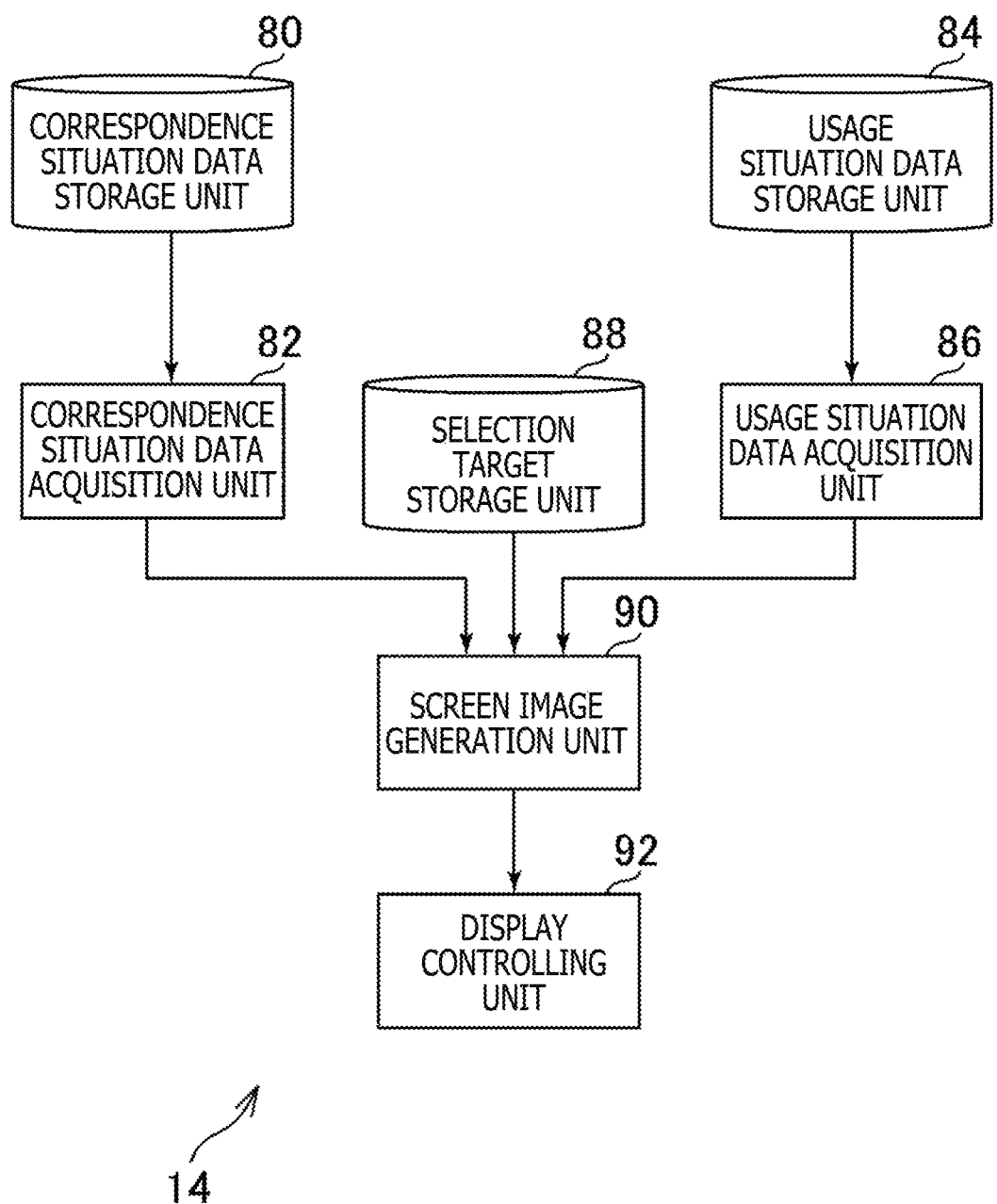

FIG.9

| COMMUNICATION HISTORY ID | COMMUNICATION START TIME DATA | COMMUNICATION END TIME DATA |
|---|---|---|
| 001 | 2018/1/9 22:22:05 | 2018/1/9 23:55:36 |
| 002 | 2018/1/11 19:05:20 | 2018/1/11 21:36:12 |
| 003 | 2018/1/12 20:19:06 | 2018/1/12 21:47:47 |
| 004 | 2018/1/13 21:08:52 | 2018/1/13 22:51:10 |

FIG. 10

| EXECUTION HISTORY ID | PROGRAM ID | CONTENT ID | EXECUTION START TIME DATA | EXECUTION END TIME DATA | VR DISPLAY PRESENCE DATA | SAVE PRESENCE DATA |
|---|---|---|---|---|---|---|
| 001 | 002 | - | 2018/1/9 22:23:10 | 2018/1/9 23:53:20 | Y | Y |
| 002 | 005 | 001 | 2018/1/11 19:12:37 | 2018/1/11 21:35:10 | Y | N |
| 003 | 008 | - | 2018/1/12 20:21:11 | 2018/1/12 21:46:45 | N | Y |
| 004 | 004 | - | 2018/1/13 21:12:11 | 2018/1/13 22:50:01 | N | Y |

ENTERTAINMENT APPARATUS, DISPLAY CONTROLLING METHOD, AND DISPLAY CONTROLLING PROGRAM

TECHNICAL FIELD

The present invention relates to an entertainment apparatus, a display controlling method and a display controlling program.

BACKGROUND ART

An entertainment apparatus capable of executing a program such as a game program and reproducing content such as movie content with a media player is available.

In such an entertainment apparatus as just described, a screen image in which a plurality of selection targets such as title images from which programs or content can be identified and which allow a user to select a program to be executed or content to be reproduced are deployed is generally displayed. If the user selects a selection target on the screen image, then execution of a program identified by the selection target or reproduction of content identified by the selection target is performed.

Further, in recent years, programs and content compatible with virtual reality (VR) display and programs and content for which VR display is essentially required are increasing from programs to be reproduced and content to be executed by entertainment apparatus. In such programs and content as just described, for example, an image representing a state when a user views in a sight direction from a viewpoint deployed in a three-dimensional virtual space in which three-dimensional virtual objects are deployed is displayed on a head-mounted display (HMD) unit that is communicatable with the entertainment apparatus. Otherwise, an image representing a state in which the inner side of a virtual object is viewed from a viewpoint deployed in the inside of a spherical virtual object in which an image captured, for example, by an all sky camera is mapped to the inner side is displayed on the HMD.

When such VR display as described above is performed, if the user who wears the HMD thereon changes the posture of the head, then the position or the direction of the viewpoint deployed in a virtual space changes in response to the change of the posture. Therefore, the user who wears the HMD thereon can experience such a sense as if the user were in the virtual space.

SUMMARY

Technical Problem

The compatibility situation with VR display is various depending upon a program to be executed or content to be reproduced by an entertainment apparatus. For example, programs that are executed and content that is reproduced by an entertainment apparatus include those that are compatible with VR display and those that are not compatible with VR display. Further, programs to be executed and content to be reproduced by an entertainment apparatus include those that essentially require VR display and those that do not essentially require VR display.

Further, some users own an HMD capable of communicating with an entertainment apparatus and some users do not own such an HMD.

Nevertheless, conventionally a compatibility situation of a program or content identified by a selection target with VR display is not indicated on a screen image in which a plurality of selection targets such as title images are deployed.

Therefore, for example, in the case where the user selects a program or content that essentially requires, for example, VR display on the current screen image, it is indicated to the user after such selection that VR display is essentially required. This is inconvenient especially, for example, to a user who does not own an HMD.

Here, it is conceivable to cause a selection target itself, for example, a title image to indicate that the selection target is compatible with VR display or essentially requires VR display. However, this gives rise to the necessity, in the case where the selection target becomes compatible with VR display or where VR display becomes essentially required by update, to change the selection target itself such as a title image.

The present invention has been made in view of such a situation as described above, and it is an object of the present invention to provide an entertainment apparatus, a display controlling method and a display controlling program that are capable of presenting a compatibility situation of a program or content with VR display to a user without relying upon representation by a selection target itself from which the program or the content can be identified.

Solution to Problem

In order to solve the subject described above, the entertainment apparatus according to the present invention is an entertainment apparatus that displays a screen image including a plurality of selection targets of a user deployed from which programs to be executed or content to be reproduced in response to selection of the user are identifiable, the entertainment apparatus including a compatibility situation data acquisition unit configured to acquire compatibility situation data indicative of a compatibility situation with virtual reality display of the programs or the content upon selection by the user, the compatibility situation data being different from the selection targets, a screen image generation unit configured to generate, on the basis of the compatibility situation data, the screen image including information indicative of a compatibility situation with virtual reality display of the program to be executed or the content to be reproduced in response to selection from the selection targets, and a display controlling unit configured to cause the screen image to be displayed.

According to one aspect of the present invention, the compatibility situation data acquisition unit acquires the compatibility situation data indicative of whether or not virtual reality display is essentially required, and the screen image generate unit generates the screen image that includes information indicative of whether or not virtual reality display of the program to be executed or the content to be reproduced in response to selection from the selection target is essentially required.

Further, according to the one aspect of the present invention, the entertainment apparatus further includes a usage situation data acquisition unit configured to acquire usage situation data indicative of a usage situation of a head-mounted display on which an image generated by the program or an image of the content is to be displayed, in which the screen image generation unit generates one of the screen that includes information indicative of a compatibility situation with the virtual reality display and the screen image that does not include the information in response to the usage situation data.

In this aspect, the usage situation data acquisition unit may acquire the usage situation data indicative of a communication history between the entertainment apparatus and the head-mounted display, and the screen image generation unit may generate one of the screen image that includes information indicative of a compatibility situation with the virtual reality display and the screen image that does not include the information in response to the communication history.

Alternatively, the usage situation data acquisition unit may acquire the usage situation data indicative of a history of virtual reality display, and the screen image generation unit may generate one of the screen image that includes information indicative of a compatibility situation with the virtual reality display and the screen image that does not include the information on the basis of the history of the virtual reality display.

In this aspect, the screen image generation unit may generate, on the basis of a history of the virtual reality display, the screen image indicative of whether or not virtual reality display has been executed in regard to the program or the content identified by the selection target.

Further, in the one aspect of the present invention, the screen image generation unit generates one of the screen image that includes information indicative of a compatibility situation with the virtual reality display and the screen image that does not include the information in response to a result of confirmation of whether or not communication with a head-mounted display on which an image generated by the program or an image of the content is to be displayed is possible.

Further, in the one aspect of the present invention, the compatibility situation data acquisition unit acquires the compatibility situation data indicative of a compatibility situation with virtual reality display of the program or the content identified by the selection target after the program or the content is updated, and the screen image generation unit generates, on the basis of the compatibility situation data, the screen image in which, in regard to the program or the content that has become compatible with virtual reality display by the update, the event is indicated.

In this aspect, the screen image generation unit may generate, on the basis of the compatibility situation data, the screen image in which, in regard to the content that has been executed before the update and has become compatible with virtual reality display by the update or in regard to the content that has been executed before the update and has become compatible with virtual reality display by the update, the event is indicated.

Further, in the one aspect of the present invention, the display controlling unit causes a display, which is different from a head-mounted display on which an image generated by the program or an image of the content is to be displayed, to display the screen image.

Meanwhile, the display controlling method according to the present invention is a display controlling method for causing a screen image including a plurality of selection targets of a user deployed from which programs to be executed or content to be reproduced in response to selection of the user are identifiable, to be displayed, the display controlling method including a step of acquiring compatibility situation data indicative of a compatibility situation with virtual reality display of the programs or the content upon selection by the user, the compatibility situation data being different from the selection targets, a step of generating, on the basis of the compatibility situation data, the screen image including information indicative of a compatibility situation with virtual reality display of the program to be executed or the content to be reproduced in response to selection from the selection targets, and a step of causing the screen image to be displayed.

Further, the display controlling method according to the present invention is a display controlling program for causing a computer to execute a process for causing a screen image including a plurality of selection targets of a user deployed from which programs to be executed or content to be reproduced in response to selection of the user are identifiable, to be displayed, the display controlling program causing the computer to execute a procedure for acquiring compatibility situation data indicative of a compatibility situation with virtual reality display of the programs or the content upon selection by the user, the compatibility situation data being different from the selection targets, a procedure for generating, on the basis of the compatibility situation data, the screen image including information indicative of a compatibility situation with virtual reality display of the program to be executed or the content to be reproduced in response to selection from the selection targets, and a procedure for causing the screen image to be displayed.

BRIEF DESCRIPTION OF DRAWINGS

FIG. 8 is a functional block diagram depicting an example of functions incorporated in the entertainment apparatus according to the embodiment of the present invention.

FIG. 9 is a view depicting an example of communication history data.

FIG. 10 is a view depicting an example of execution history data.

DESCRIPTION OF EMBODIMENT

In the following, an embodiment of the present invention is described with reference to the drawings.

Figure 1:
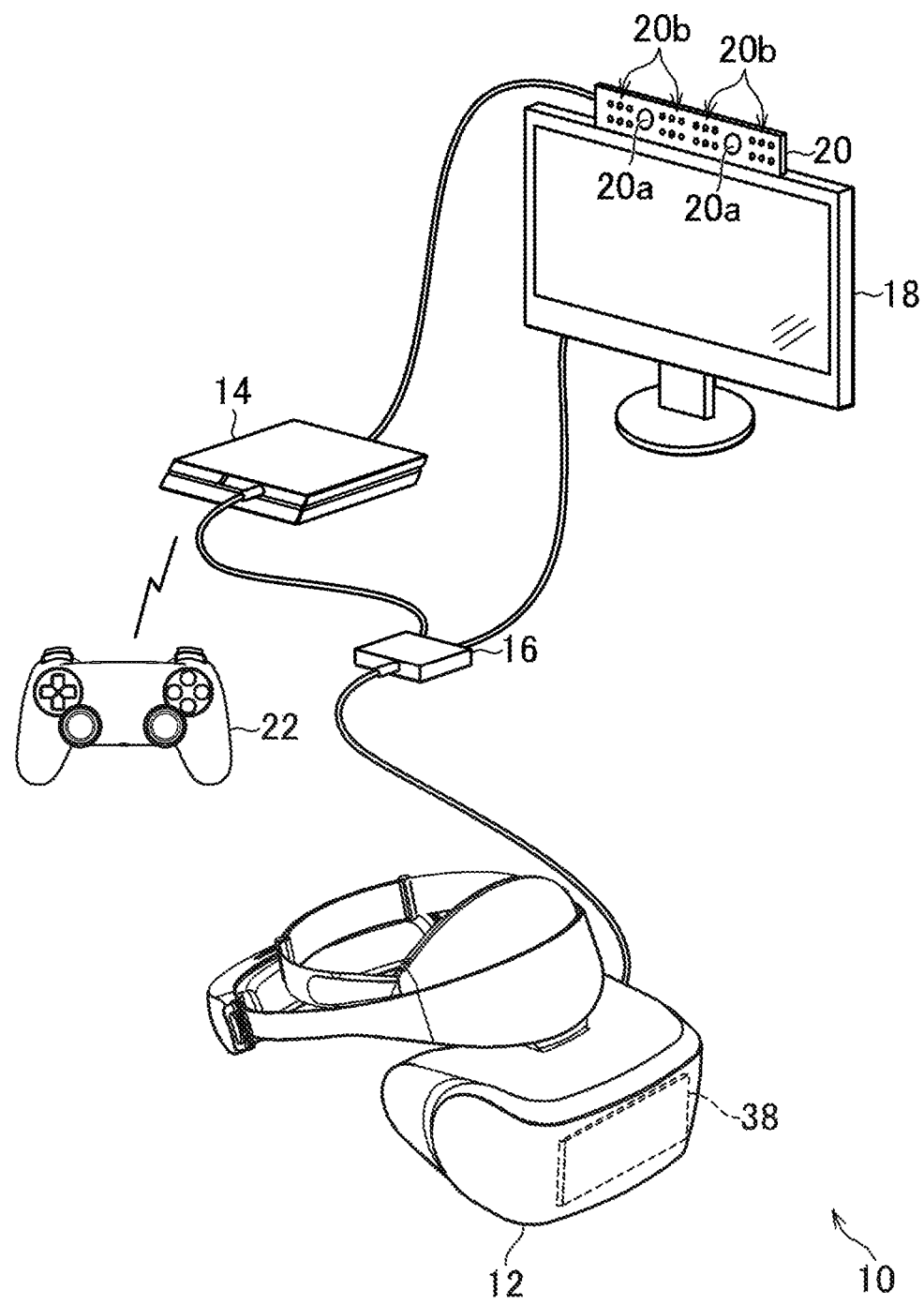
FIG. 1 is a view depicting an example of a configuration of an entertainment system according to an embodiment of the present invention.
Figure 2A:
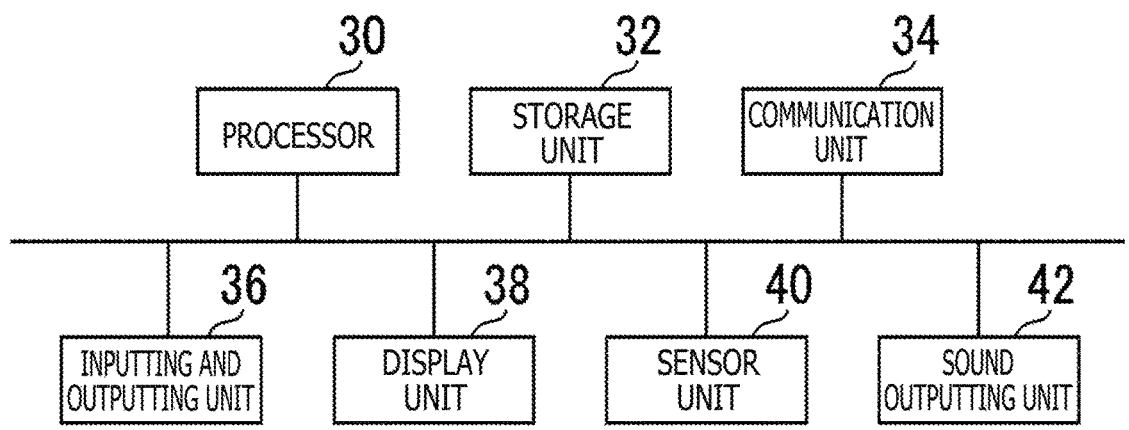
FIG. 2A is a block diagram depicting an example of a head-mounted display according to the embodiment of the present invention.
Figure 2B:
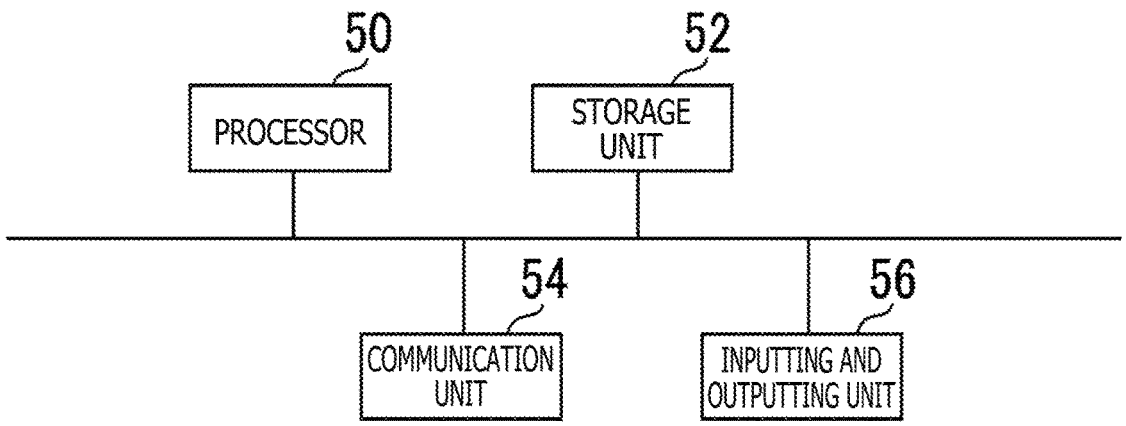
FIG. 2B is a block diagram depicting an example of an entertainment apparatus according to the embodiment of the present invention.

FIG. 1 is a view depicting an example of a configuration of an entertainment system 10 according to the embodiment of the present invention. FIG. 2A is a view depicting an example of a configuration of a head-mounted display (HMD) 12 according to the present embodiment. FIG. 2B is a view depicting an example of a configuration of an entertainment apparatus 14 according to the present invention.

As depicted in FIG. 1, the entertainment system 10 according to the present embodiment includes the HMD 12, the entertainment apparatus 14, a relay apparatus 16, a display 18, a camera microphone unit 20 and a controller 22.

The HMD 12 according to the present embodiment includes, for example, as depicted in FIG. 2A, a processor 30, a storage unit 32, a communication unit 34, an inputting and outputting unit 36, a display unit 38, a sensor unit 40 and a sound outputting unit 42.

The processor 30 is a program-controlled device such as a microprocessor that operates in accordance with a program installed, for example, in the HMD 12.

The storage unit 32 is a storage element such as, for example, a read-only memory (ROM) or a random access memory (RAM). The storage unit 32 stores a program and so forth to be executed by the processor 30.

The communication unit 34 is a communication interface such as, for example, a wireless local area network (LAN) module.

The inputting and outputting unit 36 includes input/output ports such as, for example, an HDMI (High-Definition Multimedia Interface) port, a universal serial bus (USB) port and an auxiliary (AUX) port.

The display unit 38 is a display such as, for example, a liquid crystal display or an organic EL display arranged on the front side of the HMD 12 and displays a video and so forth generated by the entertainment apparatus 14. The display unit 38 is accommodated in a housing of the HMD 12. The display unit 38 may receive, for example, a video signal outputted from the entertainment apparatus 14 and relayed by the relay apparatus 16 and output a video represented by the video signal. The display unit 38 according to the present embodiment is configured such that it can display, for example, an image for the left eye and an image for the right eye thereby to display a three-dimensional image. It is to be noted that the display unit 38 may otherwise be of the type in which it cannot display a three-dimensional image and only can display a two-dimensional display.

The sensor unit 40 includes sensors such as, for example, an acceleration sensor and a motion sensor. The sensor unit 40 outputs motion data indicative of results of measurement of the rotation amount, movement amount and so forth of the HMD 12 at a predetermined frame rate to the processor 30.

The sound outputting unit 42 includes, for example, a headphone, a speaker or the like and outputs sound represented by sound data generated by the entertainment apparatus 14. The sound outputting unit 42 receives a sound signal, for example, outputted from the entertainment apparatus 14 and relayed by the relay apparatus 16 and outputs sound represented by the sound signal.

The entertainment apparatus 14 according to the present embodiment is a computer such as, for example, a game console, a digital versatile disc (DVD) player or a Blu-ray (registered trademark) player. The entertainment apparatus 14 according to the present embodiment generates a video and an audio by execution of a game program or reproduction of content, for example, stored therein or recorded on an optical disk. Then, the entertainment apparatus 14 according to the present embodiment outputs a video signal representative of a video to be generated and an audio signal representative of sound to be generated to the HMD 12 and the display 18 through the relay apparatus 16.

The entertainment apparatus 14 according to the present embodiment includes, for example, as depicted in FIG. 2B, a processor 50, a storage unit 52, a communication unit 54 and an inputting and outputting unit 56.

The processor 50 is a program-controlled device such as a central processing unit (CPU) that operates in accordance with a program, for example, installed in the entertainment apparatus 14. The processor 50 according to the present embodiment also includes a GPU (Graphics Processing Unit) that draws an image into a frame buffer on the basis of a graphics command and data supplied thereto from the CPU.

The storage unit 52 is a storage device such as, for example, a ROM or a RAM, a hard disk driver or the like. The storage unit 52 stores a program and so forth to be executed by the processor 50. Further, in the storage unit 52 according to the present embodiment, a region for a frame buffer into which an image is to be drawn by the GPU is assured.

The communication unit 54 is a communication interface such as, for example, a wireless LAN module.

The inputting and outputting unit 56 includes input/output ports such as an HDMI (registered trademark) (High-Definition Multimedia Interface) port and a USB port.

The relay apparatus 16 according to the present embodiment is a computer that relays a video signal and an audio signal outputted from the entertainment apparatus 14 and outputs the signals to the HMD 12 and the display 18.

The display 18 according to the present embodiment is, for example, a liquid crystal display or the like and displays a video represented by a video signal or the like outputted from the entertainment apparatus 14.

The camera microphone unit 20 according to the present embodiment may include a camera 20a that outputs, for example, a captured image of an imaging target to the entertainment apparatus 14 and a microphone 20b that acquires ambient sound, converts the sound into sound data and outputs the sound data to the entertainment apparatus 14. Further, the camera 20a according to the present embodiment is a stereo camera.

The HMD 12 and the relay apparatus 16 can perform transmission and reception of data, for example, by wired or wireless transmission therebetween. The entertainment apparatus 14 and the relay apparatus 16 are connected to each other, for example, by an HDMI cable, a USB cable or a like cable such that transmission and reception of data can be performed therebetween. The relay apparatus 16 and the display 18 are connected to each other, for example, by an HDMI cable or the like. The entertainment apparatus 14 and the camera microphone unit 20 are connected to each other, for example, by an AUX cable or a like cable.

The controller 22 according to the present embodiment is an operation inputting device for performing operation inputting to the entertainment apparatus 14. The user can depress a direction key or a button provided on the controller 22 and tilt an operation stick to perform various operation inputs using the controller 22. Then, in the present embodiment, the controller 22 outputs input data associated with an operation input to the entertainment apparatus 14. Further, the controller 22 according to the present embodiment includes a USB port. Thus, by connection to the entertainment apparatus 14 with a USB cable, the controller 22 can output input data to the entertainment apparatus 14 by wired transmission. Further, the controller 22 according to the present embodiment includes a wireless communication module or the like such that it can output input data to the entertainment apparatus 14 by wireless transmission.

Note that it is assumed that an operation of the user described below can be performed not only by an operation for the controller 22 but also by a sound input to the microphone 20b.

Figure 3A:
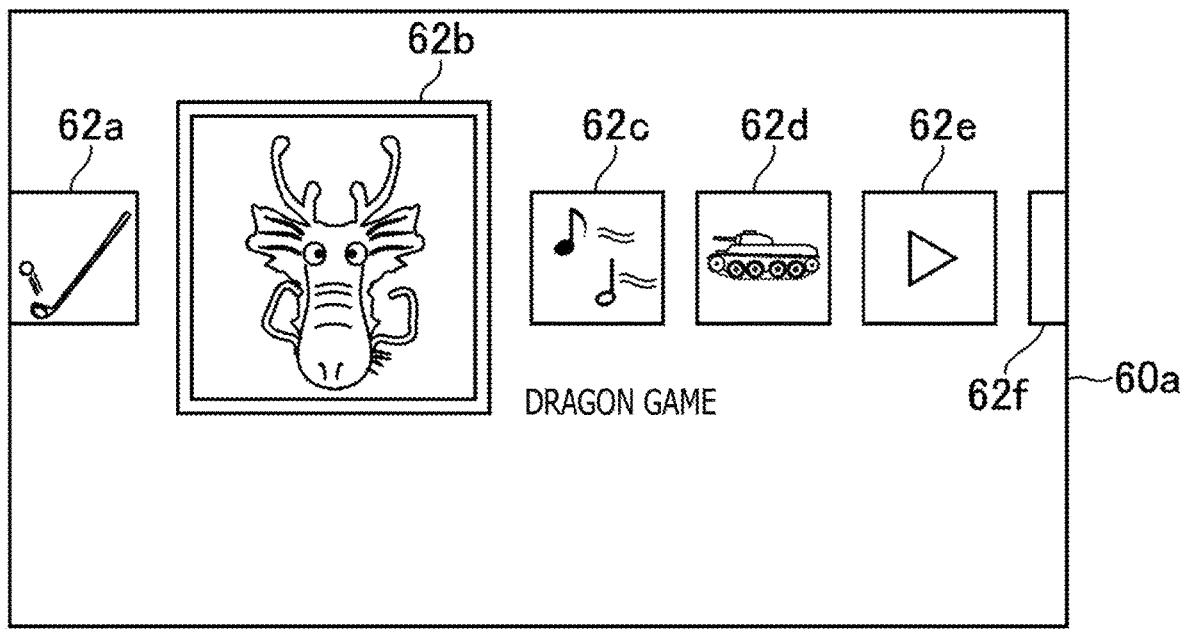
FIG. 3A is a view depicting an example of a home screen image.
Figure 3B:
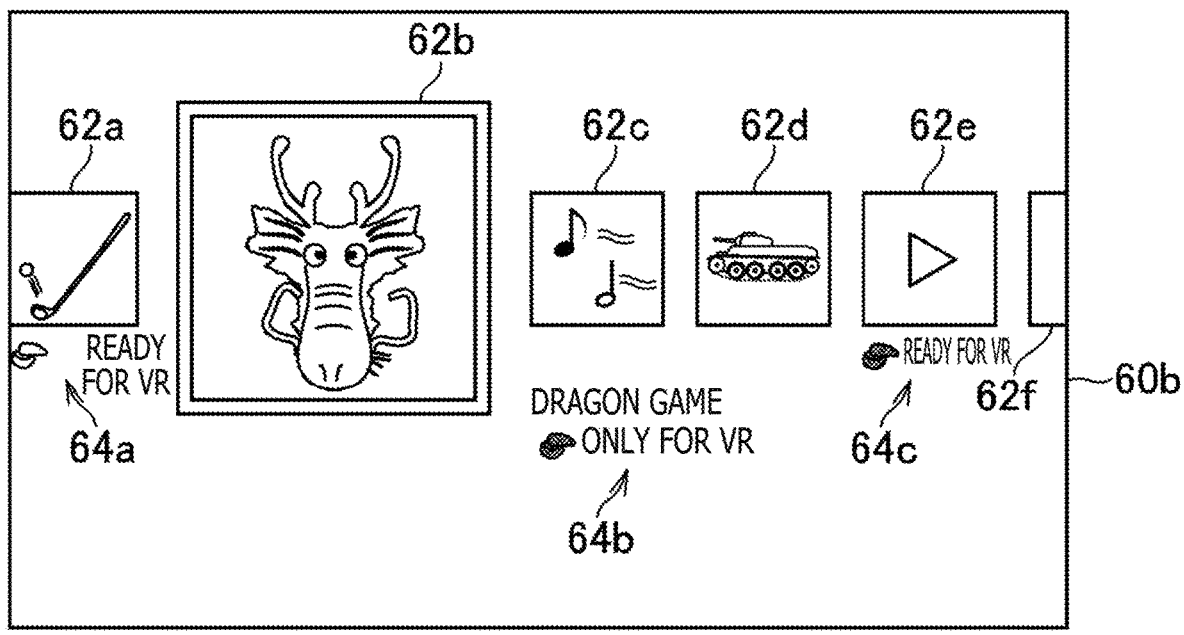
FIG. 3B is a view depicting another example of a home screen image.

FIGS. 3A and 3B are views depicting an example of a home screen image 60 displayed on the display 18 according to the present embodiment. In the present embodiment, the entertainment apparatus 14 can perform, on the home screen image 60, one of a plurality of programs installed in the entertainment apparatus 14.

In the present embodiment, one of a home screen image 60a depicted in FIG. 3A and a home screen image 60b depicted in FIG. 3B is displayed, for example, in response to whether or not a predetermined condition is satisfied.

In the home screen image 60a depicted in FIG. 3A, a plurality of selection target images 62 (62a to 62f) from which programs stored in the entertainment apparatus 14 can be identified individually are deployed. The selection target images 62 may be, for example, title images of the programs.

Further, in the present embodiment, the user can place one of the plurality of selection target images 62, from which the programs different from each other are identified individually, into a selected state by an operation. FIG. 3A depicts the home screen image 60a in which the selection target image 62b is in a selected state. As depicted in FIG. 3A, a character string representative of the name of a program that can be identified from the selection target image 62b may be deployed in the lower right with respect to the selection target image 62b that is in a selected state.

Further, in the present embodiment, the user can change the selection target image 62, which is in a selected state and from which a program can be identified, by performing a changing operation of the selection target image 62 in the selected state.

Further, in the present embodiment, when the user performs a selection operation, a program identified from the selection target image 62 in the selected state is executed. It is to be noted that the program identified from the selection target image 62 in the selected state may be started in response to a selection operation. If the program is executed, then an image generated by the program is displayed on the display 18 and the display unit 38 of the HMD 12.

Also in the home screen image 60b depicted in FIG. 3B, a plurality of selection target images 62 are deployed similarly as in the home screen image 60a depicted in FIG. 3A. However, in the home screen image 60b depicted in FIG. 3B, also VR compatibility presentation information 64 (64a to 64c) is deployed. In the present embodiment, by the home screen image 60b in which such VR compatibility presentation information 64 as depicted in FIG. 3B is deployed, it is presented to the user whether or not a program identified from the selection target image 62 is compatible with virtual reality display (VR display).

Figure 4:
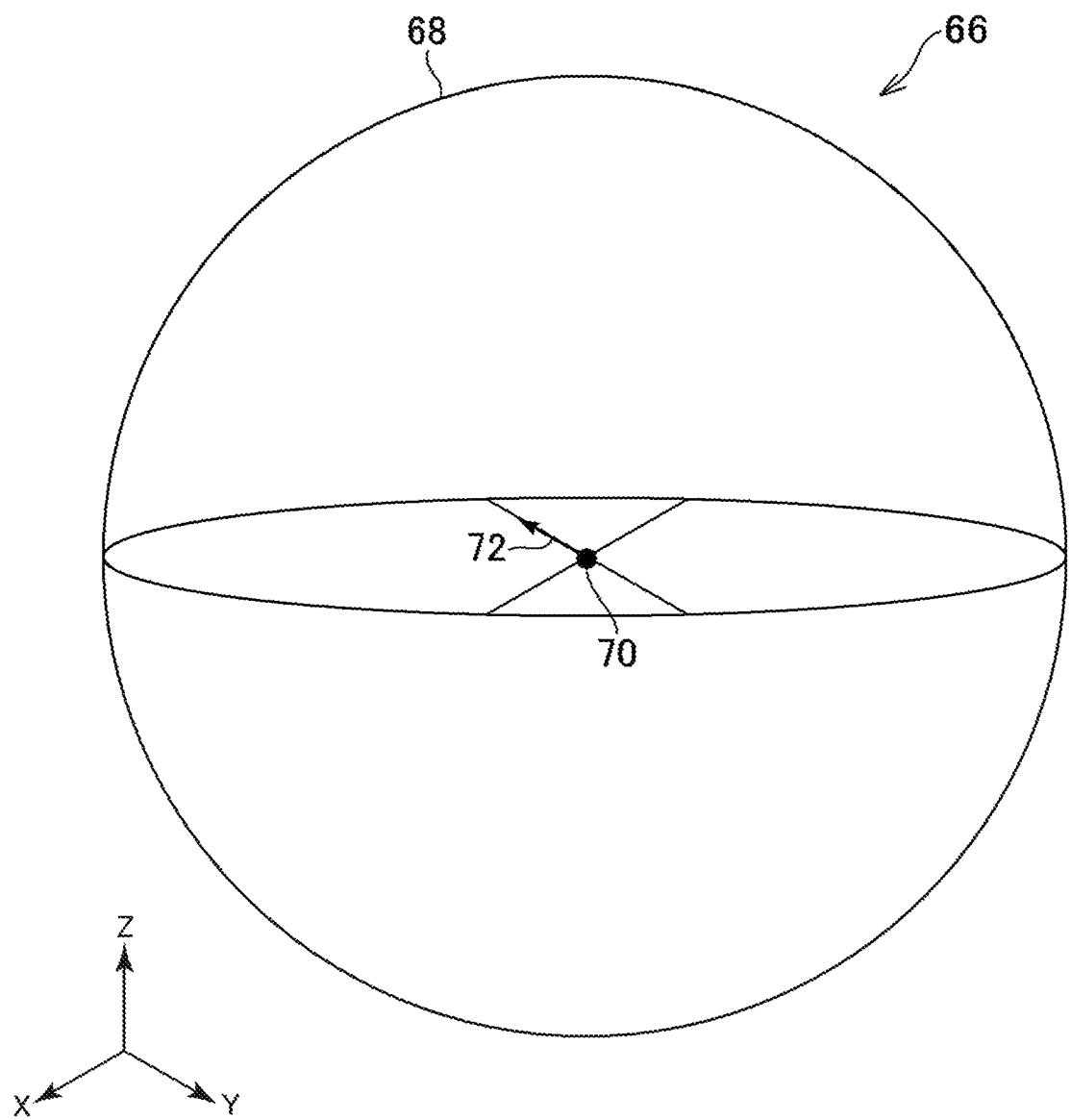
FIG. 4 is a view depicting an example of a virtual space.

Here, as an example of the VR display in the present embodiment, display of an image representative of a state when the user sees in a sight direction 72 from a viewpoint 70 deployed in the inside of a spherical virtual object 68 having an image mapped to the inner side thereof in a three-dimensional virtual space 66 as depicted in FIG. 4 is available. Here, the image mapped to the inner side of the virtual object 68 may be, for example, an all sky image captured by an all sky camera. It is to be noted that the shape of the virtual object 68 need not be a spherical shape but may be a shape representative of part of a spherical face such as a semispherical shape or a ¼ spherical shape or may be some other shape. Further, as another example of the VR display, an image representing a state when the user sees in the sight direction 72 from the viewpoint 70 deployed in the three-dimensional virtual space 66 in which a three-dimensional object configured from a plurality of polygons is deployed is available.

Further, an image displayed in the VR display in the present embodiment is displayed, for example, on the display unit 38 of the HMD 12. Then, if the user wearing the HMD 12 changes the posture of the head, then the position of the viewpoint 70 deployed in the virtual space 66 and the sight direction 72 change in response to the change of the posture.

The VR compatibility presentation information 64 in the present embodiment is deployed in an associated relationship with the selection target images 62 in the home screen image 60b. In the example of FIG. 3B, the VR compatibility presentation information 64a is deployed in an associated relationship with the selection target image 62a in the home screen image 60b. Further, the VR compatibility presentation information 64b is deployed in an associated relationship with the selection target image 62b in the home screen image 60b. Further, the VR compatibility presentation information 64c is deployed in an associated relationship with the selection target image 62e in the home screen image 60b.

In the example of FIG. 3B, it is presented to the user that the programs identified by the selection target image 62a, selection target image 62b and selection target image 62e are compatible with VR display. On the other hand, it is presented to the user that the programs identified by the selection target image 62c, selection target image 62d and selection target image 62f are not compatible with VR display.

In this manner, in the entertainment system 10 according to the present embodiment, a compatibility situation of programs or content with VR display can be presented to the user without relying upon the representation by the selection target images 62 themselves. Further, the user can grasp, for each of a plurality of programs, whether or not the program is compatible with VR display.

As depicted in FIG. 3B, the VR compatibility presentation information 64 includes VR compatibility icons representing that programs identified from associated selection target images 62 are compatible with VR display and VR essential requirement character strings indicative of whether or not VR display is essentially required. In the example of FIG. 3B, in the case where VR display is essentially required in a program identified by a selection target image 62, the VR essential requirement character string of "Only for VR" is included in a VR compatibility presentation information 64 associated with the selection target image 62. On the other hand, in the case where VR display is not essentially required for a program identified from a selection target image 62, a VR essential requirement character string of "Compatible with VR" is included in the VR compatibility presentation information 64 associated with the selection target image 62.

Here, that VR display essentially required indicates that, for example, when the HMD 12 and the entertainment apparatus 14 are not communicatable with each other and an image generated by the program is in a situation in which it is not displayed on the display unit 38, execution of the program is restricted. For example, it is assumed that, although a selection target image 62 corresponding to a program for which VR display is essentially required is selected, the HMD 12 and the entertainment apparatus 14 are not communicatable with each other. In this case, for example, when the program is executed, such a message as "Connect the HMD" may be displayed on the display 18.

On the other hand, that VR display not essentially required indicates a state in which, for example, when the HMD 12 and the entertainment apparatus 14 are communicatable with each other and an image generated by the program is in a situation in which it is displayed on the display unit 38 of the HMD 12, VR display is performed, but in any other case, VR is not performed. It is to be noted that, in regard to a program for which VR display is not essentially required, it may be possible to allow the user to perform switching between a state in which VR display is performed and another state in which VR display is not performed. In this case, when the HMD 12 and the entertainment apparatus 14 are not communicatable with each other, an image generated by the program may be displayed on the display 18.

Further, a program is available which defines switching between a state in which VR display is essentially required and another state in which VR display is not essentially required, for example, depending upon a scene. The VR compatibility presentation information 64 associated with the selection target image 62 of such a program as just described may include a VR essential requirement character string of "VR partly essentially required."

In this manner, with the entertainment system 10 according to the present embodiment, the user can grasp, for each of a plurality of programs, whether or not VR display is essentially required in the program.

Further, in the present embodiment, for example, whether or not VR display has been executed in regard to a program identified from a selection target image 62 associated with VR compatibility presentation information 64 is indicated by a VR compatibility icon included in the VR compatibility presentation information 64. In the example of FIG. 3B, in the case where VR display has been executed already in regard to a program identified from a selection target image 62 associated with VR compatibility presentation information 64, slanting lines are applied to the VR compatibility icon included in the VR compatibility presentation information 64. On the other hand, in the case where VR display has not been executed as yet in regard to a program identified from a selection target image 62 associated with VR compatibility presentation information 64, no slanting lines are applied to the VR compatibility icon included in the VR compatibility presentation information 64.

In this manner, with the entertainment system 10 according to the present embodiment, the user can grasp, in regard to each of a plurality of programs, whether or not VR display has been executed already with the program.

Figure 5:
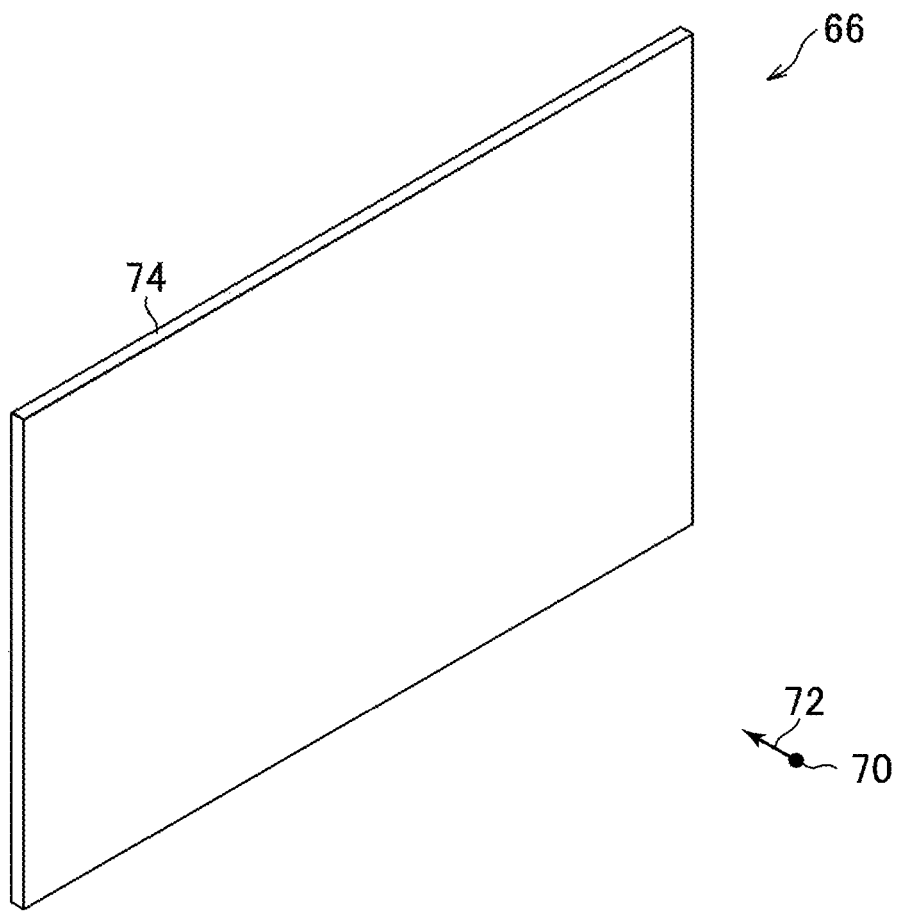
FIG. 5 is a view depicting another example of a virtual space.

It is to be noted that, in the present embodiment, the home screen image 60 exemplified in FIG. 3A or 3B may be displayed on the display unit 38 of the HMD 12. In this case, for example, the home screen image 60 may be deployed in a plate-shaped virtual object 74 deployed in the virtual space 66 as depicted in FIG. 5. Then, an image may be displayed which represents a state when the user sees in the sight direction 72 from the position of the viewpoint 70 in the virtual space 66 toward the virtual object 74. It is to be noted that the home screen image 60 may be displayed on both of the display 18 and the display unit 38 of the HMD 12. Further, the home screen image 60 may be displayed on only one of the display 18 and the display unit 38 of the HMD 12 in response to a user operation.

For example, in a program by which switching is performed between a situation in which VR display is performed and another situation in which VR display is not performed depending upon a scene, display may be switched between a situation in which VR display is performed and another situation in which VR display is not performed. For example, in the situation in which VR display is performed, a display representative of a state when the user sees in the sight direction 72 from the viewpoint 70 deployed in the inside of the virtual object 68 as depicted in FIG. 4 may be displayed on the display unit 38 of the HMD 12. On the other hand, in the situation in which VR display is not performed, an image representative of a state when the user sees in the sight direction 72 from the position of the viewpoint 70 in the virtual space 66 toward the virtual object 74 may be displayed on the display unit 38 of the HMD 12.

Figure 6A:
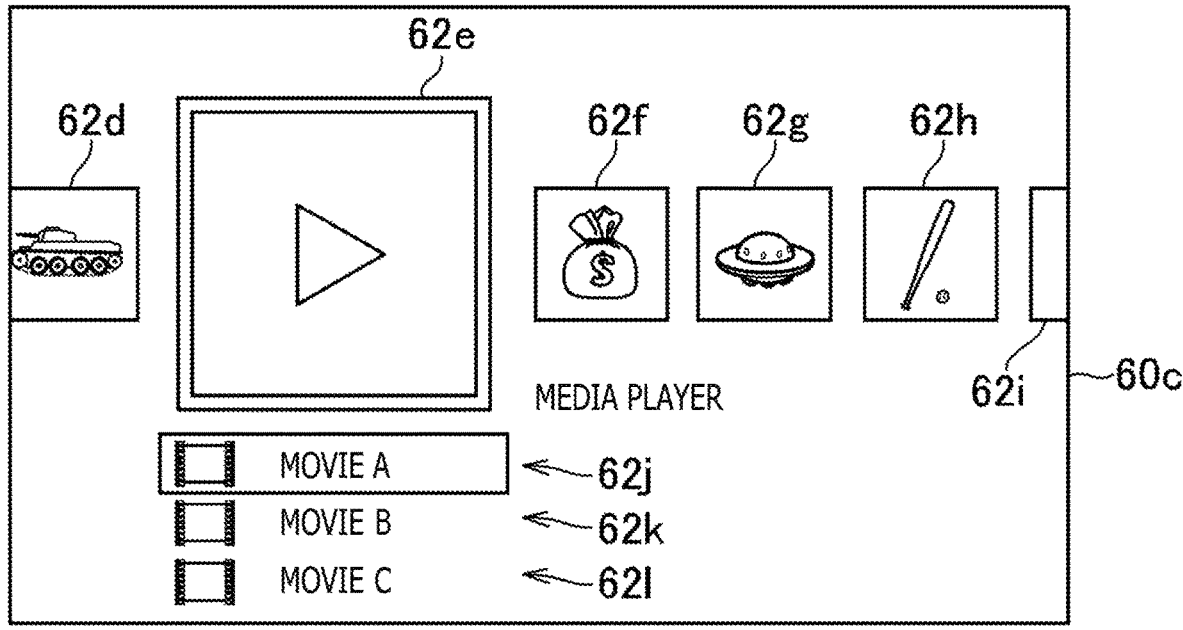
FIG. 6A is a view depicting a further example of a home screen image.
Figure 6B:
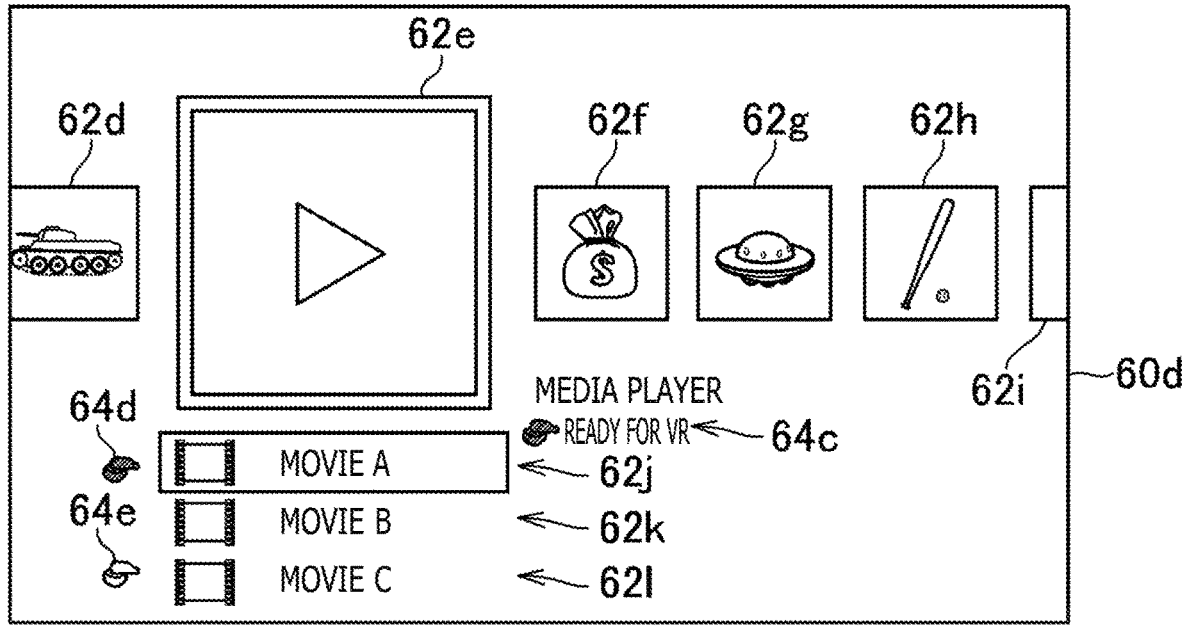
FIG. 6B is a view depicting a still further example of a home screen image.

FIGS. 6A and 6B are views each depicting an example of a home screen image 60 in which the selection target image 62e from which a media player is identified is in a selected state. In the home screen image 60c depicted in FIG. 6A, selection target images 62 (62j to 62l) from which content can be reproduced by a media player are deployed together with selection target images 62 (62d to 62i) from which programs are identified. The content may be, for example, content stored in the entertainment apparatus 14, content recorded on an optical disk, or content that can be downloaded through the Internet or a like network. Further, the selection target images 62 associated with the content may be title images of the content.

Further, in the present embodiment, when the selection target image 62e from which a media player is identified is in a selected state in the home screen image 60c, one of a plurality of selection target images 62 from which content different from each other is identified can be placed into a selected state. FIG. 6A depicts the home screen image 60c in which the selection target image 62e is in a selected state and the selection target image 62j is in a selected state. In the present embodiment, if the user performs a changing operation of the selection target image 62 that is in a selected state through the controller 22, then from among the selection target images 62 associated with content, the selection target image 62 that is in a selected state can be changed.

Further, in the present embodiment, if the user performs a selection operation, then content identified from a selection target image 62 that is in a selected state is reproduced. Here, for example, a media player may be executed such that the content is reproduced by the executed media player. It is to be noted that, in this case, the media player may be started in response to the selection operation. If the content is reproduced, then an image of the content is displayed on the display 18 and the display unit 38 of the HMD 12.

Also in the home screen image 60d depicted in FIG. 6B, a plurality of selection target images 62 (62d to 62l) individually associated with programs or content is deployed similarly as in the home screen image 60c depicted in FIG. 6A. However, in the home screen image 60d depicted in FIG. 6B, VR compatibility presentation information 64 (64c to 64e) is deployed together. As depicted in FIG. 6B, the VR compatibility presentation information 64 deployed in an associated relationship with the selection target images 62 associated with the content may include VR compatibility icons.

Here, the VR compatibility presentation information 64c is deployed in the home screen image 60d in an associated relationship with the selection target image 62e from which a program (media player) is identified. Further, the VR compatibility presentation information 64d and the VR compatibility presentation information 64e are deployed in the home screen image 60d in an associated relationship with selection target images 62 from which content is identified. In the example of FIG. 6B, the VR compatibility presentation information 64d is deployed in the home screen image 60d in an associated relationship with the selection target image 62j. Further, the VR compatibility presentation information 64e is deployed in the home screen image 60d in an associated relationship with the selection target image 62l.

In the example of FIG. 6B, it is presented to the user that a program identified from the selection target image 62e is compatible with VR display. Further, it is presented to the user that the selection target image 62d, selection target image 62f, selection target image 62g, selection target image 62h and selection target image 62i are not compatible with VR display. Further, it is presented to the user that content identified from the selection target image 62j and the selection target image 62l are compatible with VR display while content identified from the selection target image 62k is not compatible with VR display.

In this manner, with the entertainment system 10 according to the present embodiment, the user can grasp, for each of a plurality of content, whether or not the content is compatible with VR display.

Figure 6C:
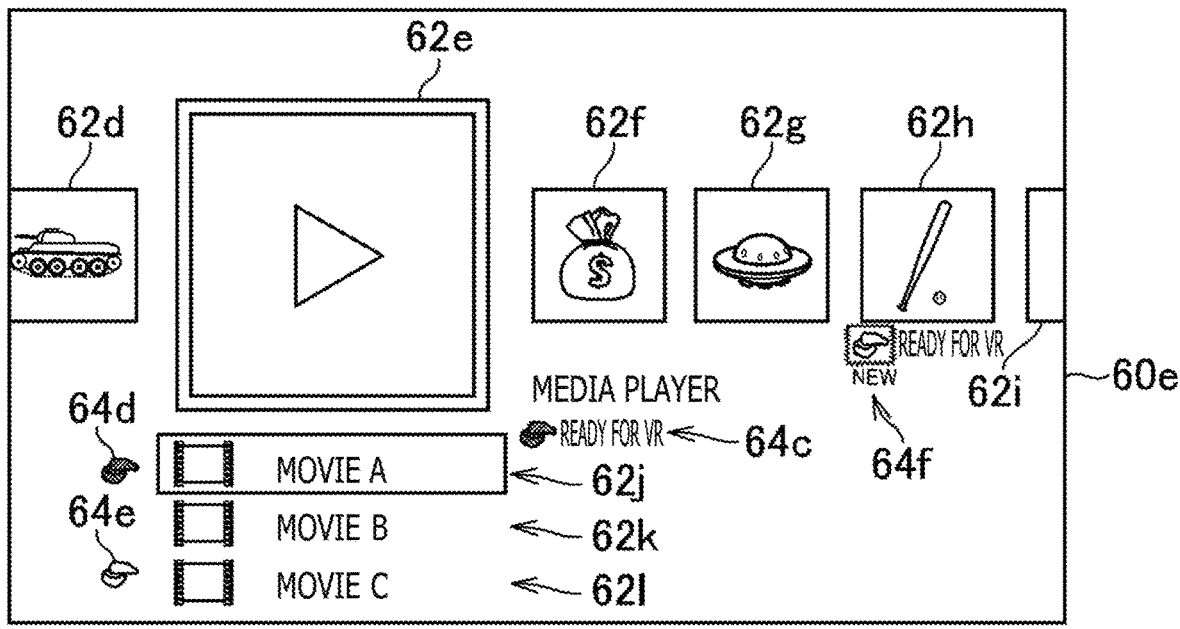
FIG. 6C is a view depicting a yet further example of a home screen image.

Here, it sometimes occurs that a program or content that has not been compatible with VR display becomes compatible with VR display by update of the same. In such a case, in an associated relationship with a selection target image 62 of the program or the content having become compatible with VR display by such update, VR compatibility presentation information 64f indicating this may be deployed in a home screen image 60e as depicted in FIG. 6C. Here, it is assumed that, when the home screen image 60d depicted in FIG. 6B is displayed, the program identified from the selection target image 62h is not compatible with VR display and, by update of the program, the program becomes compatible with VR display when the home screen image 60e depicted in FIG. 6C is displayed. The VR compatibility presentation information 64f includes, different from the VR compatibility presentation information 64a to 64e, a VR compatibility icon indicating that the program or the content has become compatible with VR display by update. In the example of FIG. 6C, it is presented to the user that a program identified from the selection target image 62h has become compatible with VR display by update.

In this manner, with the entertainment system 10 according to the present embodiment, the user can grasp, for each of a plurality of programs or content, whether or not the program or the content has become compatible with VR by update. Further, in this case, the selection target image 62 itself need not be changed.

Figure 7A:
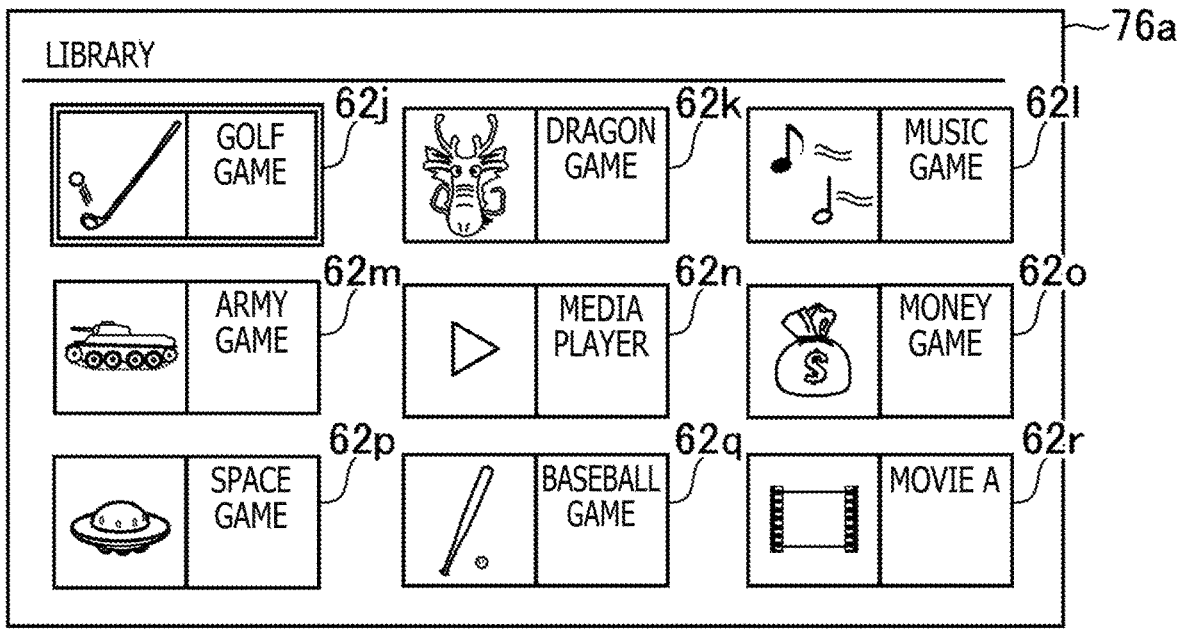
FIG. 7A is a view depicting an example of a library screen image.
Figure 7B:
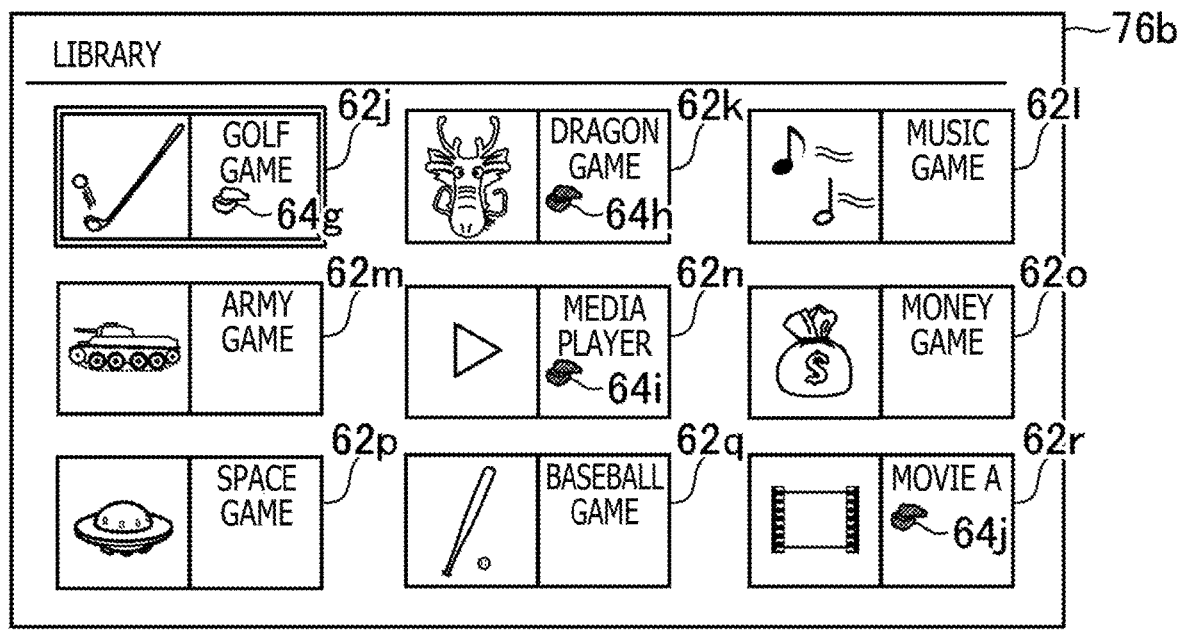
FIG. 7B is a view depicting an example of a library screen image.
Figure 7C:
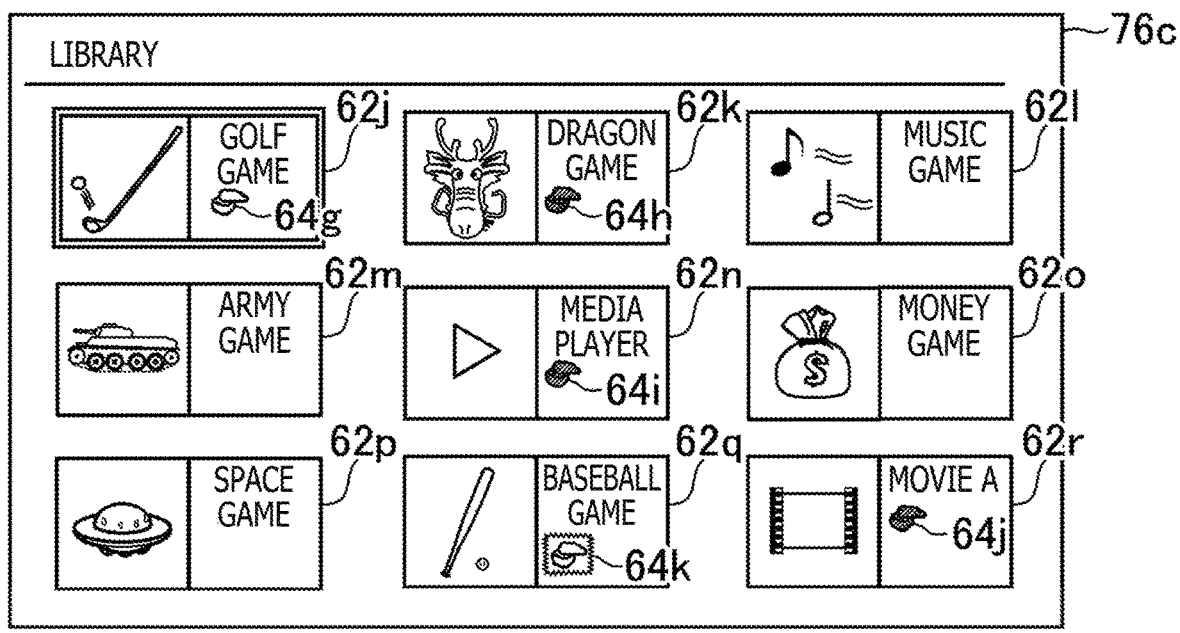
FIG. 7C is a view depicting another example of a library screen image.

FIGS. 7A to 7C are views each depicting an example of a library screen image 76 displayed on the display 18 according to the present embodiment. In the library screen image 76a depicted in FIG. 7A, selection target images 62 (62j to 62r) from which programs and content that is selection targets of a user are deployed. Different from the home screen image 60, in the library screen image 76, the selection target images 62 from which programs are identified and the selection target images 62 from which content is identified are deployed in a mixed manner. Meanwhile, in the library screen image 76b depicted in FIG. 7B, not only selection target images 62 but also VR compatibility presentation information 64 (64g to 64k) are deployed. The VR compatibility presentation information 64g to 64k includes VR compatibility icons.

In the example of FIG. 7B, it is presented to the user by the VR compatibility presentation information 64g that a program identified from the selection target image 62j is compatible with VR display. Meanwhile, it is presented to the user by the VR compatibility presentation information 64h that a program identified from the selection target image 62k is compatible with VR display. Further, it is presented to the user by the VR compatibility presentation information 64i that a program identified from the selection target image 62n is compatible with VR display. Further, it is presented to the user by the VR compatibility presentation information 64j that content identified from the selection target image 62r is compatible with VR display. Further, it is presented to the user that programs identified from the selection target image 62l, selection target image 62m, selection target image 62o, selection target image 62p and selection target image 62q are not compatible with VR display.

Similarly as in the home screen image 60, also in the library screen image 76, in the case where the selection target image 62 from which a program is identified is in a selected state, the program is executed if the user performs a selection operation. Further, in the case where a selection target image 62 from which content is identified is in a selected state, the content is reproduced if the user performs a selection operation.

Similarly as in the home screen image 60e depicted in FIG. 6C, in regard to a program or content that has become compatible with VR display by update, VR compatibility presentation information 64k indicating this may be deployed in a library screen image 76c as depicted in FIG. 7C. In the example of FIG. 7C, it is presented to the user that a program identified from the selection target image 62q has become compatible with VR display by being updated.

In the following, functions of the entertainment apparatus 14 and processes executed by the entertainment apparatus 14 are further described.

FIG. 8 is a functional block diagram depicting an example of functions incorporated in the entertainment apparatus 14 according to the present embodiment. It is to be noted that all of the functions depicted in FIG. 8 need not be incorporated in the entertainment apparatus 14 according to the present embodiment and other functions than the functions depicted in FIG. 8 may be incorporated.

As depicted in FIG. 8, the entertainment apparatus 14 functionally includes, for example, a compatibility situation data storage unit 80, a compatibility situation data acquisition unit 82, a usage situation data storage unit 84, a usage situation data acquisition unit 86, a selection target storage unit 88, a screen image generation unit 90 and a display controlling unit 92. The compatibility situation data storage unit 80, usage situation data storage unit 84 and selection target storage unit 88 are incorporated mainly as the storage unit 52. The compatibility situation data acquisition unit 82 and the usage situation data acquisition unit 86 are incorporated mainly as the processor 50. The screen image generation unit 90 is incorporated mainly as the processor 50 and the storage unit 52. The display controlling unit 92 is incorporated mainly as the processor 50, communication unit 54 and inputting and outputting unit 56.

The functions described above may be incorporated in the processor 50 by executing a program installed in the entertainment apparatus 14 that is a computer and including instructions corresponding to the functions described above. This program may be supplied, for example, through a computer-readable information storage medium such as an optical disk, a magnetic disk, a magnetic tape, a magnetooptical disk or a flash memory or through the Internet or a like to the entertainment apparatus 14.

The compatibility situation data storage unit 80 acquires, in the present embodiment, compatibility situation data indicative of a compatibility situation with VR display of a program or content, for example, upon selection by the user. Here, in the present embodiment, the compatibility data is data different from a selection target such as the selection target images 62. For example, the compatibility situation data may be program, a header of content, or the like. Further, the compatibility situation data may be data indicative of whether or not VR display is essentially required.

The compatibility situation data acquisition unit 82 acquires, in the present embodiment, for example, compatibility situation data. Here, the compatibility situation data acquisition unit 82 may acquire compatibility situation data stored in the compatibility situation data storage unit 80. Alternatively, the compatibility situation data acquisition unit 82 may analyze, for example, data of a program or content (for example, data of the body) to specify whether or not the program or the content is compatible with VR display. Then, the compatibility situation data acquisition unit 82 may acquire compatibility situation data indicative of a result of the specification.

Further, the compatibility situation data acquisition unit 82 may specify programs or content having been updated till the present point of time after last display of a screen image. Then, the compatibility situation data acquisition unit 82 may specify any of the specified programs or content, which was not compatible with VR display upon last display of an image but has become compatible with VR display by update. Then, the compatibility situation data acquisition unit 82 may acquire compatibility situation data indicating a compatibility situation of the specified programs or content for VR display after update.

The usage situation data storage unit 84 stores, in the present embodiment, for example, usage situation data indicative of a usage situation of the HMD 12 that displays an image generated by a program or an image of content. As an example of the usage situation data, such communication history data exemplified in FIG. 9 or execution history data exemplified in FIG. 10 is available.

The communication history data depicted in FIG. 9 is data indicative of a communication history, for example, between the entertainment apparatus 14 and the HMD 12. As depicted in FIG. 9, the communication history data includes, for example, a communication history identification (ID), communication start time data and communication end time data.

The communication history ID included in the communication history data is identification information, for example, of communication history data. The communication start time data included in the communication history data is data indicative of start time of communication between the entertainment apparatus 14 and the HMD 12 corresponding to the communication history. The communication start end data is data indicative of end time of communication between the entertainment apparatus 14 and the HMD 12 corresponding to the communication history data.

The execution history data depicted in FIG. 10 is, for example, data indicative of an execution history of programs identified by the selection target image 62 and data indicative of a reproduction history of content identified by the selection target image 62. As depicted in FIG. 10, the execution history data includes, for example, an execution history ID, a program ID, content ID, execution start time data, execution end time data, VR display presence data and save presence data.

The execution history ID included in the execution history data is identification information, for example, of the execution history data. The program ID included in the history execution data is identification information, for example, of an executed program. It is assumed that, in the present embodiment, the program ID is associated in one-to-one correspondence with a selection target image 62 from which a program is identified. The content ID included in the history execution data is identification information, for example, of a reproduced content. It is assumed that, in the present embodiment, the content ID is associated in one-to-one correspondence with a selection target image 62 from which content is identified.

The execution start time data included in the history execution data is data indicative of time at which execution of a program identified, for example, from a program ID included in the execution history data is started. The execution end time data included in the history execution data is data indicative of time at which execution of a program identified, for example, from a program ID included in the execution history data is ended.

The VR display presence data included in the history execution data is data indicative of whether or not VR display in execution of a program, for example, identified from a program ID included in the execution history data has been executed. In the present embodiment, for example, in the case where VR display has been executed, "Y" is set as a value of the VR display presence data, but in the case where VR display has not been executed, "N" is set as a value of the VR display presence data. In this manner, a history of VR display may be included in the execution history data according to the present embodiment.

The save presence data included in the history execution data is data indicative of whether or not, in execution of the program identified, for example, from the program ID included in the execution history data, storage of save data relating to the program has been executed.

For example, it is assumed that, upon execution of a program of a game, an event of save or auto save according to an operation of the user occurs and save data of the program is stored into the storage unit 52 of the entertainment apparatus 14. In this case, "Y" may be set as a value of the save presence data included in the execution history data associated with execution of the program. It is to be noted that the save data may include setting data indicative of settings and so forth of the game.

Further, upon execution of a program of a game for the first time, save data of the program is sometimes stored automatically into the storage unit 52 of the entertainment apparatus 14. In this case, "Y" may be set as a value of the save presence data included in the execution history data associated with the execution of the program.

Further, for example, upon execution for the first time of a program of a game recorded on an information recording medium such as an optical disk, data that is a copy of a game content of the program (game data) is sometimes stored into the storage unit 52 of the entertainment apparatus 14. In this case, "Y" may be set as a value of the save presence data included in the execution history data associated with the execution of the program.

The usage situation data acquisition unit 86 acquires, in the present embodiment, for example, usage situation data.

Here, the usage situation data acquisition unit 86 may acquire usage situation data stored in the usage situation data storage unit 84.

It is to be noted that, for example, upon starting of the entertainment apparatus 14 or in a like case, the usage situation data acquisition unit 86 may confirm whether or not communication of the entertainment apparatus 14 with the HMD 12 is possible. Then, the usage situation data acquisition unit 86 may acquire usage situation data indicative of a result of the confirmation.

The selection target storage unit 88 stores, in the present embodiment, for example, a selection target of the user from which a program to be executed or content to be reproduced in response to selection of the user can be identified. The selection target storage unit 88 stores, for example, the selection target image 62 described hereinabove.

The screen image generation unit 90 generates, in the present embodiment, for example, on the basis of the selection target image 62 and compatibility situation data, a home screen image 60 or a library screen image 76 to be displayed on the display 18 and the display unit 38 of the HMD 12. Here, the screen image generation unit 90 may generate a screen image including VR compatibility presentation information 64 indicative of a compatibility situation with VR display of a program to be executed or content to be reproduced in response to selection of a selection target.

Further, the screen image generation unit 90 may generate a screen image including VR compatibility presentation information 64 indicative of whether or not VR display of a program to be executed or content to be reproduced in response to selection of a selection target is essentially required like the home screen image 60*b* depicted in FIG. 3B or the home screen image 60*d* depicted in FIG. 6B. Further, in regard to a program by which a situation in which VR display is essentially required or another situation in which VR display is not essentially required is determined depending upon a scene, the screen image generation unit 90 may generate a screen image including a selection target image 62 from which the program with which the VR compatibility presentation information 64 indicative of the situation is associated is identified.

Further, the screen image generation unit 90 may generate one of a screen image that includes VR compatibility presentation information 64 and a screen image that does not include VR compatibility presentation information 64 in response to usage situation data. This makes it possible to control whether or not VR compatibility presentation information 64 is to be presented to the user in response to a usage situation of the user.

Here, for example, the screen image generation unit 90 may specify, on the basis of the communication history data, whether or not communication between the entertainment apparatus 14 and the HMD 12 has been performed till now. Then, in response to a result of the specification, the screen image generation unit 90 may generate one of a screen image that includes VR compatibility presentation information 64 and a screen image that does not include VR compatibility presentation information 64. For example, when it is specified that communication between the entertainment apparatus 14 and the HMD 12 has been performed till now, the screen image generation unit 90 may generate a screen image including VR compatibility presentation information 64. On the other hand, when it is specified that communication between the entertainment apparatus 14 and the HMD 12 has not been performed till now, the screen image generation unit 90 may generate a screen image that does not include VR compatibility presentation information 64. As a result of this, to a user who has experienced VR display, a screen image including VR compatibility presentation information 64 is presented, but to a user who has not experienced VR display, a screen image that does not include VR compatibility presentation information 64 is presented.

Further, the screen image generation unit 90 may generate one of a screen image that includes VR compatibility presentation information 64 and another screen image that does not include VR compatibility presentation information 64 in response to a result of confirmation of communication possibility between the entertainment apparatus 14 and the HMD 12. For example, in the case where the usage situation data acquired by the usage situation data acquisition unit 86 indicates that communication between the entertainment apparatus 14 and the HMD 12 is possible, the screen image generation unit 90 may generate a screen image that includes VR compatibility presentation information 64. On the other hand, in the case where the usage situation data acquired by the usage situation data acquisition unit 86 indicates that communication between the entertainment apparatus 14 and the HMD 12 is impossible, the screen image generation unit 90 may generate a screen image that does not include VR compatibility presentation information 64. By this, in the case where the entertainment apparatus 14 and the HMD 12 are communicatable with each other, a compatibility situation with VR display in regard to each program or each content is presented to the user.

Further, the screen image generation unit 90 may generate a screen image in which selection target images 62 of programs and content for which VR display is essentially required are not deployed. Here, for example, in the case where it is specified that communication between the entertainment apparatus 14 and the HMD 12 has not been performed till now and that communication between the entertainment apparatus 14 and the HMD 12 is impossible, a screen image of this may be generated. In this case, images in which selection target images 62 of programs and content in regard to which VR display is not essentially required are deployed are generated.

Further, for selection target images 62 of programs and content in regard to which VR display is essentially required, a screen image in which they are in a gray out state may be generated. Here, for example, in the case where it is specified that communication between the entertainment apparatus 14 and the HMD 12 has not been performed till now and that communication between the entertainment apparatus 14 and the HMD 12 is impossible, an image of this may be generated. Further, in this case, the selection target images 62 deployed in a gray out state may be controlled such that they cannot be placed into a selected state by an operation of the user.

It is to be noted that, even in a state in which communication between the entertainment apparatus 14 and the HMD 12 is impossible, a selection operation of a selection target image 62 from which a program or content with regard to which VR display is essentially required is specified may be possible. In this case, execution of a program or reproduction of content corresponding to the selection target image 62 may be started in response to the selection operation. Then, after execution of a program or reproduction of content is started, a screen image in which a message for prompting for connection to the HMD 12 such as "connect the HMD" is deployed may be displayed on the display 18.

Further, after execution of a program or reproduction of content compatible with VR display is started, a screen image in which a message representing compatibility with VR display such as "compatible with VR display" may be displayed on the display 18 and the display unit 38 of the HMD 12. Further, it may also be possible to perform switching between a situation in which VR display is performed and another situation in which VR display is not performed in response to a user operation. Further, when execution of a program or reproduction of content is started, the user may be able to select whether or not VR display is to be performed.

Further, the screen image generation unit 90 may generate one of a screen image that includes VR compatibility presentation information 64 and another screen image that does not include VR compatibility presentation information 64 on the basis of the execution history data. For example, in the case where VR display has been executed, a screen image that includes VR compatibility presentation information 64 may be generated. On the other hand, for example, in the case where VR display has not been executed, a screen image that does not include VR compatibility presentation information 64 may be generated.

Further, the screen image generation unit 90 may generate one of a screen image that includes VR compatibility presentation information 64 and another screen image that does not include VR compatibility presentation information 64 on the basis of a value of the save presence data included in the execution history data (in other words, on the basis of presence or absence of save data or game data). Here, for example, in the case where the execution history data stored in the usage situation data storage unit 84 includes execution history data in which the value of the save presence data is "Y," a screen image that includes VR compatibility presentation information 64 may be generated. On the other hand, for example, in the case where the execution history data stored in the usage situation data storage unit 84 does not include execution history data in which the value of the save presence data is "Y," a screen image that does not include VR compatibility presentation information 64 may be generated.

Further, from within the execution history data stored in the usage situation data storage unit 84, execution history data including a program ID of a program with regard to which VR display is essentially required or which is compatible with VR display may be specified. Then, in the case where execution history data in regard to which the value of the save presence data is "Y" exists in the specified execution history data, a screen image that includes VR compatibility presentation information 64 may be generated. On the other hand, in the case where execution history data in regard to which the value of the save presence data is "Y" does not exist in the specified execution history data, a screen image that does not include VR compatibility presentation information 64 may be generated.

Further, the screen image generation unit 90 may generate, on the basis of the execution history data, a screen image indicating whether or not VR display has been executed in regard to a program or content identified by the selection target. For example, a screen image may be generated which includes VR compatibility presentation information 64 including a VR compatibility icon to which slanting lines are applied and VR compatibility presentation information 64 including a VR compatibility icon to which slanting lines are not applied.

Further, for example, the screen image generation unit 90 may specify, from within the execution history data acquired by the usage situation data acquisition unit 86, execution history data including a program ID of a program that is compatible with VR display or essentially requires VR display. Then, a screen image may be generated in which, with the selection target image 62 for identifying a program corresponding to execution history data to which "Y" is set as a value of the VR display presence data, VR compatibility presentation information 64 that includes a VR compatibility icon to which slanting lines are applied is associated. On the other hand, a screen image may be generated in which, with the selection target image 62 for identifying a program corresponding to execution history data to which "N" is set as a value of the VR display presence data, VR compatibility presentation information 64 that does not include a VR compatibility icon to which slanting lines are applied is associated.

Further, the screen image generation unit 90 may generate, on the basis of the execution history data, a screen image indicating whether or not save data of a program identified by a selection target is stored. Further, the screen image generation unit 90 may generate, on the basis of the execution history data, a screen image indicating whether or not game data of a program identified by a selection target is stored.

For example, the screen image generation unit 90 may specify, from within the execution history data acquired by the usage situation data acquisition unit 86, execution history data including a program ID of a program that is compatible with VR display or essentially requires VR display. Then, a screen image may be generated in which, with the selection target image 62 for identifying a program corresponding to execution history data to which "Y" is set as a value of the save presence data, VR compatibility presentation information 64 that includes a VR compatibility icon of a first color is associated. On the other hand, a screen image may be generated in which, with the selection target image 62 for identifying a program corresponding to execution history data to which "N" is set as a value of the save presence data, VR compatibility presentation information 64 that includes a VR compatibility icon of a second color is associated.

Further, the screen image generation unit 90 may specify programs or content having been updated after last display of a screen image. Then, the screen image generation unit 90 may specify, from among the specified programs, a program having become compatible with VR display by update. Further, the screen image generation unit 90 may specify, from among the specified content, content having become compatible with VR display by update. Then, the screen image generation unit 90 may generate a screen image in which, in regard to the selection target image 62 of the specified program and content, VR compatibility presentation information 64 indicating this is associated.

For example, it is assumed that compatibility situation data acquired when a program or content that is not compatible with VR is updated indicates that the program or the content is compatible with VR display or essentially requires VR display. In this case, the screen image generation unit 90 may generate a screen image including VR compatibility presentation information 64 indicating that the program or the content has become compatible with VR display by update like the VR compatibility presentation information 64*f* or the VR compatibility presentation information 64*j*.

Further, in this case, the screen image generation unit 90 may specify the program having been executed before update and having become compatible with VR display by update. Further, the screen image generation unit 90 may specify the content having been reproduced before update and having become compatible with VR display by update. Then, the screen image generation unit 90 may generate a screen image in which, with the selection target images 62 of the specified program and content, VR compatibility presentation information 64 indicating that the program and the content have become compatible with VR display by update is associated.

Further, the screen image generation unit 90 may specify programs and content that is compatible with VR display although VR display has not been executed therefor. Then, the screen image generation unit 90 may generate a screen image in which, with the selection target images 62 of the specified programs and content, VR compatibility presentation information 64 indicating that VR display has not been executed although they are compatible with VR is associated.

The display controlling unit 92 controls, in the present embodiment, for example, such that a screen image generated by the screen image generation unit 90 is displayed. For example, the display controlling unit 92 outputs data of a screen image generated by the screen image generation unit 90 to at least one of the display 18 and the display unit 38 of the HMD 12. The display 18 and the display unit 38 of the HMD 12 display the screen image in response to reception of the data of the screen image.

Figure 11:
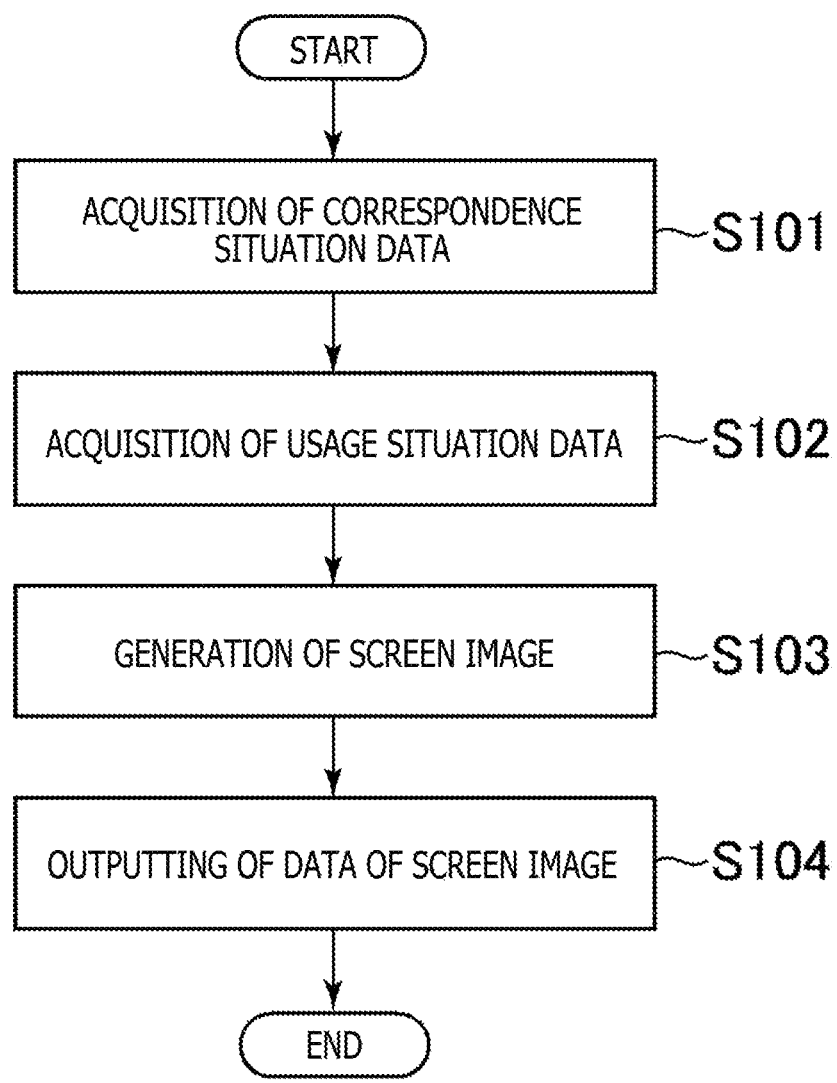
FIG. 11 is a flow chart depicting an example of a flow of processing of classification learning performed by the entertainment apparatus according to the embodiment of the present invention.

Here, an example of a flow of a display controlling process of a screen image performed by the entertainment apparatus 14 according to the present embodiment is described with reference to a flow chart exemplified in FIG. 11.

First, the compatibility situation data acquisition unit 82 acquires compatibility situation data stored in the compatibility situation data storage unit 80 (S101). Here, for example, the compatibility situation data acquisition unit 82 acquires compatibility situation data indicating whether each of programs installed and content stored in the entertainment apparatus 14 essentially requires VR display, is compatible with VR display or is not compatible with VR display.

Then, the usage situation data acquisition unit 86 acquires such usage situation data as communication history data and execution history data stored in the usage situation data storage unit 84 (S102).

Then, the screen image generation unit 90 generates a screen image such as a home screen image 60 or a library screen image 76 (S103). Here, for example, the screen image may be generated on the basis of the selection target image 62 stored in the selection target storage unit 88, the compatibility situation data acquired by the process indicated at S101 and the usage situation data acquired by the process indicated at S102.

Then, the display controlling unit 92 outputs data of the screen image generated by the process indicated at S103 to the display 18 and the HMD 12 (S104).

It is to be noted that the present invention is not limited to the embodiment described above.

Further, the particular character strings and numerical values described hereinabove and the particular character strings and numerical values in the drawings are exemplary, and the character strings and the numerical value are not restrictive.

The invention claimed is:

1. An entertainment apparatus that displays a screen image including a plurality of selectable images of programs to be executed or content to be reproduced in response to selection thereof, the entertainment apparatus comprising:
   a compatibility data acquisition unit configured to acquire compatibility data indicative of a compatibility of the programs or content with virtual reality display of the programs or the content upon selection, the compatibility data being different from the selectable images;
   a screen image generation unit configured to generate, on the basis of the compatibility data, the screen image including information indicative of compatibility of the program or content with virtual reality display of the program or content in response to selection from the selectable images;
   a display controlling unit configured to cause the screen image to be displayed, and
   a usage situation data acquisition unit configured to acquire usage situation data indicative of a usage situation of a head-mounted display on which an image generated by the program or an image of the content is to be displayed, where the usage situation data is indicative of a communication history between the entertainment apparatus and the head-mounted display, wherein:
   the screen image generation unit generates one of the screen that includes information indicative of a compatibility situation with the virtual reality display and the screen image that does not include the information in response to the usage situation data, and
   the screen image generation unit generates one of the screen image that includes information indicative of a compatibility situation with the virtual reality display and the screen image that does not include the information in response to the communication history.

2. The entertainment apparatus according to claim 1, wherein
   the compatibility situation data acquisition unit acquires the compatibility situation data indicative of whether or not virtual reality display is essentially required, and
   the screen image generate unit generates the screen image that includes information indicative of whether or not virtual reality display of the program to be executed or the content to be reproduced in response to selection from the selection target is essentially required.

3. The entertainment apparatus according to claim 1, wherein
   the usage situation data acquisition unit acquires the usage situation data indicative of a history of virtual reality display, and
   the screen image generation unit generates one of the screen image that includes information indicative of a compatibility situation with the virtual reality display and the screen image that does not include the information on the basis of the history of the virtual reality display.

4. The entertainment apparatus according to claim 3, wherein the screen image generation unit generates, on the basis of a history of the virtual reality display, the screen image indicative of whether or not virtual reality display has been executed in regard to the program or the content identified by the selection target.

5. The entertainment apparatus according to claim 1, wherein the screen image generation unit generates one of the screen image that includes information indicative of a compatibility situation with the virtual reality display and the screen image that does not include the information in response to a result of confirmation of whether or not communication with a head-mounted display on which an image generated by the program or an image of the content is to be displayed is possible.

6. The entertainment apparatus according to claim 1, wherein the compatibility situation data acquisition unit acquires the compatibility situation data indicative of a compatibility situation with virtual reality display of the program or the content identified by the selection target after the program or the content is updated; and the screen image generation unit generates, on the basis of the compatibility situation data, the screen image in which, in regard to the program or the content that has become compatible with virtual reality display by the update, the event is indicated.

7. The entertainment apparatus according to claim 6, wherein the screen image generation unit generates, on the basis of the compatibility situation data, the screen image in which, in regard to the content that has been executed before the update and has become compatible with virtual reality display by the update or in regard to the content that has been executed before the update and has become compatible with virtual reality display by the update, the event is indicated.

8. The entertainment apparatus according to claim 1, wherein the display controlling unit causes a display, which is different from a head-mounted display on which an image generated by the program or an image of the content is to be displayed, to display the screen image.

9. A display controlling method for causing a screen image including a plurality of selectable images of programs to be executed or content to be reproduced in response to selection thereof, the display controlling method comprising:

acquiring compatibility data indicative of a compatibility with virtual reality display of the programs or content upon selection by the user, the compatibility data being different from the selectable images;

generating, on the basis of the compatibility data, the screen image including information indicative of compatibility of the program or content with virtual reality display of the program or content in response to selection of the program or content from the selectable images;

causing the screen image to be displayed; and acquiring usage situation data indicative of a usage situation of a head-mounted display on which an image generated by the program or an image of the content is to be displayed, where the usage situation data is indicative of a communication history between the entertainment apparatus and the head-mounted display, wherein:

the generating includes generating one of the screen that includes information indicative of a compatibility situation with the virtual reality display and the screen image that does not include the information in response to the usage situation data, and the generating includes generating one of the screen image that includes information indicative of a compatibility situation with the virtual reality display and the screen image that does not include the information in response to the communication history.

10. A non-transitory, computer-readable storage medium containing a display controlling program, which when executed by a computer, causes the computer to execute a process for causing a screen image including a plurality of selectable images from which programs to be executed or content to be reproduced in response to selection are identifiable, to be displayed, by carrying out actions, comprising:

acquiring compatibility data indicative of a compatibility with virtual reality display of the programs or the content upon selection by the user, the compatibility data being different from the selectable images;

generating, on the basis of the compatibility data, the screen image including information indicative of compatibility with virtual reality display of the program or content in response to selection from the selectable images;

causing the screen image to be displayed; and acquiring usage situation data indicative of a usage situation of a head-mounted display on which an image generated by the program or an image of the content is to be displayed, where the usage situation data is indicative of a communication history between the entertainment apparatus and the head-mounted display, wherein:

the generating includes generating one of the screen that includes information indicative of a compatibility situation with the virtual reality display and the screen image that does not include the information in response to the usage situation data, and the generating includes generating one of the screen image that includes information indicative of a compatibility situation with the virtual reality display and the screen image that does not include the information in response to the communication history.

* * * * *